(12) United States Patent
Millette et al.

(10) Patent No.: US 7,359,875 B1
(45) Date of Patent: Apr. 15, 2008

(54) METHOD FOR STRUCURING AN EQUITY ISSUE UTILIZING A CLOSED BLOCK BUSINESS ENTITY

(75) Inventors: Michael Millette, Larchmont, NY (US); Michael Rotter, New York, NY (US); Shiv Kumar, Short Hills, NJ (US); Omar Javed Chaudhary, New York City, NY (US); Cliff Brokaw, New York, NY (US); David Govrin, Short Hills, NJ (US)

(73) Assignee: Goldman Sachs & Co., New York, NY (US)

( * ) Notice: Subject to any disclaimer, the term of this patent is extended or adjusted under 35 U.S.C. 154(b) by 1311 days.

(21) Appl. No.: 09/900,554

(22) Filed: Jul. 6, 2001

(51) Int. Cl.
*G06Q 40/00* (2006.01)

(52) U.S. Cl. ............................ 705/36; 705/35; 705/36; 705/37

(58) Field of Classification Search .................. 705/35, 705/36, 37
See application file for complete search history.

(56) References Cited

U.S. PATENT DOCUMENTS

| | | | |
|---|---|---|---|
| 6,321,212 B1* | 11/2001 | Lange ....................... | 705/36 R |
| 6,381,585 B1* | 4/2002 | Maples et al. ............ | 705/36 R |
| 6,879,964 B2* | 4/2005 | Sauter et al. .................. | 705/37 |
| 7,096,195 B1* | 8/2006 | Maples ....................... | 705/36 R |
| 7,181,423 B2* | 2/2007 | Blanchard et al. ........ | 705/36 R |
| 7,191,148 B1* | 3/2007 | Butcher ......................... | 705/35 |
| 7,222,094 B2* | 5/2007 | Ross ......................... | 705/36 R |
| 7,249,077 B2* | 7/2007 | Williams et al. ............... | 705/35 |
| 2003/0009406 A1* | 1/2003 | Ross ........................... | 705/36 |
| 2003/0163400 A1* | 8/2003 | Ross et al. .................... | 705/35 |
| 2003/0225656 A1* | 12/2003 | Aberman et al. ............. | 705/36 |
| 2004/0006520 A1* | 1/2004 | Birle et al. ................... | 705/35 |
| 2006/0218069 A1* | 9/2006 | Aberman et al. ............. | 705/37 |
| 2007/0162365 A1* | 7/2007 | Weinreb ...................... | 705/35 |
| 2007/0226115 A1* | 9/2007 | Sherman et al. .......... | 705/36 R |

OTHER PUBLICATIONS

Willens, "Exiting a corporate investment without a tax backlash", Mergers & Acquistitions, v35, n10, pp. 40-44, Nov. 2000.*
Jordan et al., "New tax rules improve the viability of LLCs and S corporations", Ohio CPA Journal, v56, n4, pp. 23-28, Oct.-Dec. 1997.*
Hooker, "An introduction to Federal income tax issues relating to the issuance of high-yield securities", Business Lawyer, v53, n3, pp. 799-812, May 1998.*
Gibson, "The new and improved S corporation", Journal of Accountancy, v183, n6, pp. 37-41, Jun. 1997.*
U.S. Appl. No. 09/896,659, Kumar et al.

* cited by examiner

*Primary Examiner*—Nga Nguyen
(74) *Attorney, Agent, or Firm*—Greenberg Traurig, LLP

(57) ABSTRACT

A method for structuring an equity issue comprising: (a) establishing a holding company as an owner of a closed block business entity, wherein the holding company is a subsidiary of a parent company and further wherein an on-going business is a subsidiary of the parent company; (b) representing an on-going business by a first class of common stock issued from the parent company; (c) issuing a second class of common stock in the parent company, wherein the second class of common stock represents an ownership interest in the closed block business entity and wherein the closed block business entity is a lower growth and lower margin business than the on-going business; and (d) classifying proceeds received from the issuance of the second class of common stock as assets of the on-going business.

42 Claims, 4 Drawing Sheets

BALANCE SHEETS (POST TRANSACTION)

PARENT COMPANY

ASSETS
- CBB - ASSETS
- OB - ASSETS

LIABILITIES
- CBB - LIABILITIES
  (INCLUDING
     CBB - DEBT)
- OB - LIABILITIES

EQUITY
- COMMON "A" STOCK
  (INCLUDING
     OB - EQUITY)
- COMMON "B" STOCK
  (INCLUDING
     CBB - EQUITY)

ON-GOING BUSINESS ("OB")

ASSETS
- OB - ASSETS
  (INCLUDING CBB -
  DEBT PROCEEDS)

LIABILITIES
- OB - LIABILITIES

EQUITY
- COMMON "A" STOCK
  (INCLUDING
     OB - EQUITY)

CLOSED BLOCK BUSINESS ("CBB")

ASSETS
- CBB - ASSETS

LIABILITIES
- CBB - LIABILITIES
  (INCLUDING
     CBB - DEBT)

EQUITY
- COMMON "B" STOCK
  (INCLUDING
     CBB - EQUITY)

FIG. 3

METHOD FOR STRUCURING AN EQUITY ISSUE UTILIZING A CLOSED BLOCK BUSINESS ENTITY

FIELD OF THE INVENTION

The present invention pertains to a method for structuring an equity issue utilizing a closed block business and, in particular, the present invention pertains to a method of issuing stock for a closed block business entity.

BACKGROUND OF THE INVENTION

A corporation or other entity, which utilizes shares or stock to represent ownership therein, has as one of its objectives to maximize the value of shares or stock. There are a number of factors which can influence the value of a business and, hence, the value of the shares or stock of the business. Among these factors are the financial condition of the respective business that can be reflected in certain financial statements, such as, but not limited to, balance sheets, income statements, and other financial reporting statements. Ideally, business managers desire to report the most favorable conditions that are allowable under applicable laws, rules and regulations, which govern financial reporting activities.

It is not uncommon for a business to have, as part of its on-going operations, an operating unit or segment which, for one reason or another, may be viewed as a "drag" on, or adversely affect, the business' financial condition. For example, a business may have an operating unit that may be a low-margin or low-growth unit. Nevertheless, the business may be legally or morally obligated to maintain this low-margin or low-growth unit in operation. In other words, a business may, for one reason or another, be prevented from selling or "spinning-off" an otherwise financially undesirable operating unit.

Low-margin or low-growth operating units may have certain less than favorable financial operating characteristics associated therewith which, when included in the financial reporting statements of the business as a whole, can have adverse effects on the financial condition of the business and, correspondingly, can prevent the shares or stock in the business from attaining desired value levels. For numerous reasons such as legal and/or regulatory, the low-margin or low-growth operating unit(s) may not be able to be severed from the business.

As an example, one can look to insurance companies that typically have entities characterized as low-margin or low-growth businesses. While insurance companies have historically been known to provide a steady and predictable income stream for a business, laws, rules and/or regulations, which govern the operation of same can serve as an impediment to a business. Certain types of insurance may serve as an impediment to the overall business which owns same and which operates other unrelated on-going business units. Insurance companies and/or insurance policies typically provide policyholders with a dividend or bonus at the end of an operating period that can reflect profits made by the overall insurance company during that period.

Although, the current trend in the life insurance business has been to de-mutualize insurance companies which have insurance policies outstanding are still required to service these policies under existing policy guidelines. As will be readily appreciated, a conflict arises when a business desires to "spin-off" or issue an initial public offering for an insurance company or operating unit. The shareholders investing in the "spin-off" or in the initial public offering would reasonably expect to share in the profitability of the insurance entity, but the insurance entity would be obligated to dividends or bonuses, or in other words, shares its profits, with existing policyholders.

Another drawback associated with life insurance operating companies in general is that they are typically constrained from issuing unregulated debt instruments in financing operations. Traditionally, insurance companies would utilize existing assets including policy holders surplus, and expected policy premiums, in order to fund its operations while obtaining reinsurance in order to protect itself from financial downturns. A parent company of an insurance business may also, in order to protect existing client relationships and/or to protect its goodwill, elect to maintain the operations of the insurance unit.

As a result of the above, a business having an obligation to try to achieve maximum share value or stock value for its respective shareholders or stockholders may have to contend with maintaining an otherwise low-margin or low-growth business unit in operation to the detriment of its shareholders or stockholders. This may prove to be most disadvantageous to a business as it attempts to execute new business initiatives or operating strategies.

BRIEF DESCRIPTION OF THE DRAWINGS

In the Drawings:

FIG. 3 illustrates a set of exemplary balance sheets for the parent company, the ongoing business and the closed block business entity, of FIG. 1.

DETAILED DESCRIPTION OF THE INVENTION

Figure 1:
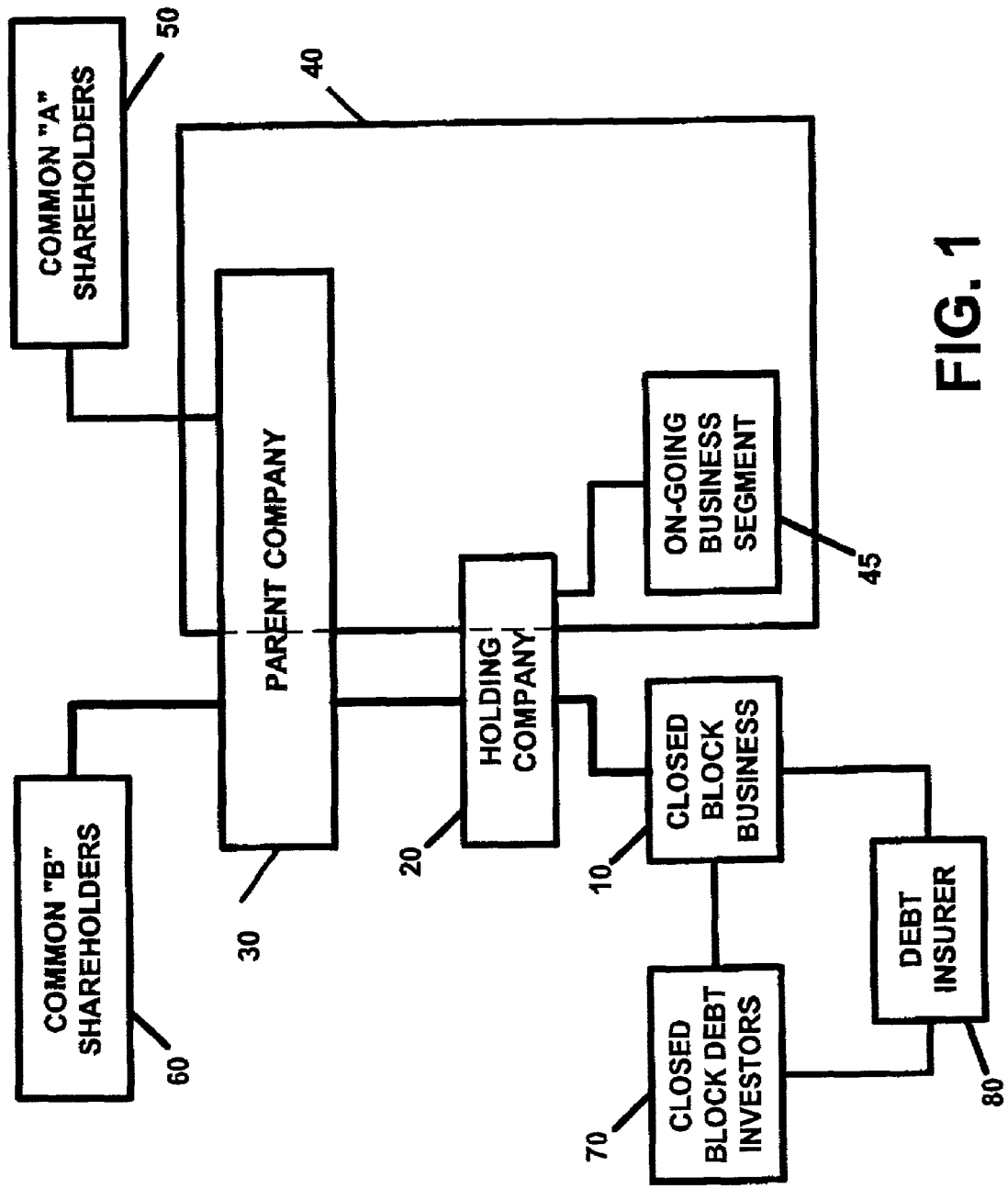
FIG. 1 illustrates a block diagram of the component businesses and investment entities which can be utilized in performing the method of the present invention.

The present invention pertains to a method for structuring an equity issue utilizing a closed block business entity and, in particular, the present invention pertains to a method for issuing a stock utilizing a closed block business entity.

In one embodiment, the present invention also pertains to a method for establishing a closed block business entity as a subsidiary of a parent company. The parent company also owns and/or operates an on-going business and/or on-going businesses.

The method of the present invention can be utilized in order to effectively de-consolidate, or separate, financial reporting entries. In one embodiment, the method of the present invention can be utilized in order to effectively de-consolidate, or separate, the liabilities and/or the debt(s) of the closed block business entity from the financial statement(s) and/or the balance sheet(s), and/or any other financial reporting activities, of other on-going business(es) of the parent company. At the same time, the parent company can include and/or enter the assets and liabilities and/or debt(s) of the closed block business entity in its consolidated financial reporting entries, which may include, but not be limited to, financial statements, balance sheets, and/or filings made pursuant to any securities, tax, and/or financial, laws, regulations, and/or rules. The parent company can also utilize the assets of the closed block business in its financial reporting activities.

In one embodiment, the method of the present invention can be effectuated by creating two distinct classes of common stock of the parent company, a first class of stock, such as, but not limited to, a Class A stock, which can represent ownership in the on-going business and the parent company, and a second class of stock, such as, but not limited to, a Class B stock, which can represent ownership in the closed block business. The second class of stock can also be described as being a "tracking stock" of the parent company. A tracking stock issuance differs from a traditional spin-off in that the business represented by the tracking stock remains wholly within the parent company. Typically, companies redesignate their existing shares as stock that follow their core business, while issuing a new class of stock for a subsidiary company to be tracked. Then they distribute shares for the tracked business segment as a tax-free dividend to current shareholders and may also issue new shares in a public offering. Unlike a spin-off, the issuance of tracking stock does not change the overall corporate governance structure. Holders of the tracking stock are considered shareholders of the parent corporation, not of the tracked business segment. A single board of directors oversees the entire corporation, including the tracked business units. Perhaps most significantly, the assets of the tracked business segment continue to be assets of the parent entity and can be used to satisfy any of the corporation's liabilities. Furthermore, capital raised through the issuance of tracking stock is not restricted for use only by the tracked business segment.

For purposes of the present invention, the first class of stock will be identified as "Class A stock" and the second class of stock will be identified as "Class B stock." However, these identifications should not be interpreted as limiting the types of stock that may be used. The "Class B" stock does necessarily have to be a tracking stock (as defined) but can be another class of stock which "tracks" the performance of a particular subsidiary of the overall parent company. Moreover, the "Class B" stock is not necessarily subordinate to the "Class A" stock.

The creation and existence of the above-described two classes of stock would require, and therefore, would result in, separate financial reporting statements which would be directed to the respective shareholders of each class of stock. In particular, the financial reporting statements for the on-going business and for the parent company can be directed to the Class A stockholders or shareholders while the financial reporting statements for the closed block business entity can be directed to the Class B stockholders or shareholders.

The method of the present invention also provides a vehicle and/or a mechanism by which a parent company, which has both one or more on-going businesses and a closed block business, can effectively de-consolidate the following, but not limited to, financial reporting entries, financial statement(s) entries, the financial statement(s), the balance sheet(s), and/or any other financial reporting activities of the closed block business from the on-going business.

The method of the present invention can also be utilized in order to effectively de-consolidate the liabilities and/or debt(s) of the closed block business from the financial statement(s) entries, the financial statement(s), the balance sheet(s), and/or any other financial reporting activities, of the on-going business(es). Such de-consolidation can be advantageous as the parent company can forego reporting the debts of the closed block business as debts of the on-going business, thereby providing a more advantageous and/or a more desirous financial reporting condition to the Class A shareholders of the on-going business. At the same time, the parent company can report on its consolidated statement, as a financial entry, the assets of the closed block business. In addition, the parent company's consolidated statement can provide a separate financial statement (e.g. in the form of a footnote) of the on-going business.

The method of the present invention can be utilized, for example, in any situation involving a business unit or entity which, while having an important role or place in an organization, or being an important component and/or entry on an organization's financial reporting statement(s) and/or on an organization's balance sheet(s), may otherwise be deemed to be a low-growth or low-margin business and/or for any reason, including, but not limited to, business, legal, regulatory, and/or other, reason(s), may be deemed to be undesirable, or viewed as a liability or potential liability, from a financial valuation perspective.

For example, low-growth or low-margin, or business units which may have liability exposure, while being a valuable asset to an organization, can also exist as a major liability or potential liability which can be a blemish on the organization's financial structure and can, therefore, impede or prevent the organization from reaching certain desired financial and/or fiscal goals. Low-growth or low-margin business units or business units which may have liability exposure, can also prevent the organization's stock from reaching certain growth or appreciation goals.

The method of the present invention can be utilized in order to separate or isolate certain selected financial statement entries of a closed block business entity from the financial statement entries of an on-going business. In this manner, liabilities and/or debt(s) of a closed block business would appear on the separate financial statements of the closed block business and would, therefore, not be reported on a financial statement(s) and/or a balance sheet(s), liabilities and/or debt(s), of the on-going business. At the same time, the parent company enters the assets of the closed block business on its financial statement(s) and/or balance sheet(s).

For example, the method of the present invention can be utilized in order to enable a parent company to classify and/or include the assets of a closed block business entity or subsidiary in its consolidated financial reporting activities, financial statement(s), and/or balance sheet(s) and, therefore, utilize same to report a more advantageous financial and/or fiscal state.

In accordance with the method of the present invention, the parent company can also utilize certain assets of the closed block business within certain regulatory and contractual restrictions. At the same time, the financial condition and/or the operations of the closed block business entity or subsidiary would not impact upon the financial reporting condition and/or the operation of the on-going business.

The method of the present invention can be utilized in any number of scenarios in order to allow a parent company to de-consolidate the financial activities of an on-going business or businesses from a low-growth, low-margin business unit with trapped capital and/or capital the use of which may be restricted, and/or a business unit which may be operating in a traditionally risky or controversial business sector, such as, but not limited to, tobacco companies, drug manufacturers, insurance companies, food companies, and/or companies having diversified operating businesses or business units, etc.

In one exemplary use, the method of the present invention can also be utilized in the insurance field in order to establish a closed block business entity from an insurance company or business unit prior to, at the time of, and/or subsequent to, a de-mutualization of the insurance company or business unit and/or prior to, at the time of, and/or subsequent to, an initial public stock offering by the insurance company or business unit or by a related entity.

Since insurance companies and their successors must continue to service present policyholders, under policy criteria, the method of the present invention can also be utilized in order to allow a parent company to continue to meet its obligations to insurance policyholders (e.g. policyholders claims and dividends), via a closed block business. The present invention can also allow the parent company to utilize the assets of the closed block business entity, without burdening the on-going business with the liabilities and/or debt(s) of the closed block business.

In one embodiment, the method of the present invention provides for the issuance of a separate class of a parent company's common stock in order to raise capital for a closed block business entity and/or for an associated holding company. The separate class of common stock can be a "tracking stock" for the parent company's stock and/or the stock for the on-going business of the parent company. In another embodiment, the holding company can raise capital for the closed block business by issuing debt to debt investors.

FIG. 1 illustrates one embodiment of the present invention showing a block diagram of the component businesses and investment entities which can be utilized in performing the method of the present invention. With reference to FIG. 1, the closed block business unit or entity (hereinafter referred to as the "closed block business entity") is designated by the reference numeral 10. For purposes of the present invention, a "closed block business entity" means a business that is established with a specific amounts of reserve funds and/or other closed block assets and these reserve funds and/or assets can only be used with the closed block business entity for a specified purpose. In one specific embodiment, the specified purpose is for paying liabilities and obligations arising from within the closed block business entity. The closed block business entity 10 can be an operating component of an existing business entity or can be a separate and distinct business in and of itself.

With reference once again to FIG. 1, in one example, the closed block business entity 10 is a wholly-owned by a holding company 20. The holding company 20, in turn, is a wholly-owned subsidiary of a parent company 30.

In another example, the parent company 30 can also own and/or operate an on-going business 40 or on-going business units 40 (hereinafter "on-going business 40") which can include one or more different on-going business operating units 45. For purposes of the present invention, an "on-going business" means any business of the parent company that is not the closed block business entity. In one example (not shown in FIG. 1), the on-going business 40 is a separate business entity (e.g. wholly-owned subsidiary or subsidiaries of the parent company 30) from the holding company 20. In a further example, the holding company 20 can also own and/or operate an on-going business unit 45, and/or a plurality of on-going business units 45, of the on-going business 40.

In one embodiment, the parent company 30 issues shares of Class A common stock (hereinafter "Class A stock"), which represents ownership in the parent company 30 and in the on-going business 40, to Common "A" shareholders 50.

The parent company 30 can also issue shares of Class B common stock (hereinafter "Class B stock"), or a "tracking stock" of the parent company 30, which represents ownership in the holding company 20, to Common "B" shareholders 60.

In another embodiment, the holding company 20 can issue debt, in the form of bonds, corporate bonds, commercial paper, convertible securities, hybrid securities, and/or any other debt instruments, to closed block debt investors 70. In a further embodiment, the debt can be insured by utilizing a debt insurer 60. In a specific embodiment, after satisfaction of the obligations and/or liabilities arising from within the closed block business entity, the debt issued by the holding company may be serviced by the revenue and/or cash flow of the closed business entity. As such, the embedded value of the closed block business entity is monetized with the substantial amount of money, which is initially required to stay in the closed block business entity that is released over time. As such, the present invention allows for the ability of the closed block business to raise debt through the establishment of the holding company.

By utilizing the debt structure and method of the present invention, one or more of the following are achieved. First, the embedded value of the closed block business entity is captured. In one embodiment, relating to an insurance company, regulatory requirements require that a substantial amount of money (e.g. several billion dollars) must stay in the closed block business entity. Therefore, by utilizing the debt structure and method of the present invention, the proceeds of the debt issuance can be used, at the present time, for the on-going business while the debt is collateralized against the money that is required to stay in the closed block business entity. As such, the embedded value of the closed block business entity is monetized. In addition, the substantial amount of money, which is initially required to stay in the closed block business entity, is released over time.

Second, favorable tax consequences are realized. For example, if the Closed Block Business Entity is sold or a reinsurance transaction is conducted for surplus relief, the proceeds of the sale or the relief from the reinsurance transaction would be taxable. In contrast, by utilizing the method and structure of the present invention, the proceeds of a debt issuance are not taxable.

Third, the proceeds of the debt issuance go directly into the holding company. For example, if reinsurance is utilized, any proceeds would go directly into the closed block business entity and thus, the proceeds would not be accessible to the parent company. In contrast, by utilizing the method and structure of the present invention, the proceeds go into the holding company and not the closed block business entity. Thus, the money is accessible to the parent company.

Fourth, the structure and method of the present invention helps focus the investors on the higher rate of investment of the on-going business. As such, the on-going business's stock (i.e. common "A") should maintain a higher value than if the on-going business was combined with the closed block business entity.

Fifth, "off-credit" (i.e. off-balance sheet) debt is achieved. By utilizing the structure and method of the present invention, credit rating agencies should recognize that the debt issued by the holding company is not debt of the on-going business. Consequently, the on-going business' credit and capital structure should not be impaired by the debt issuance.

Figure 2:
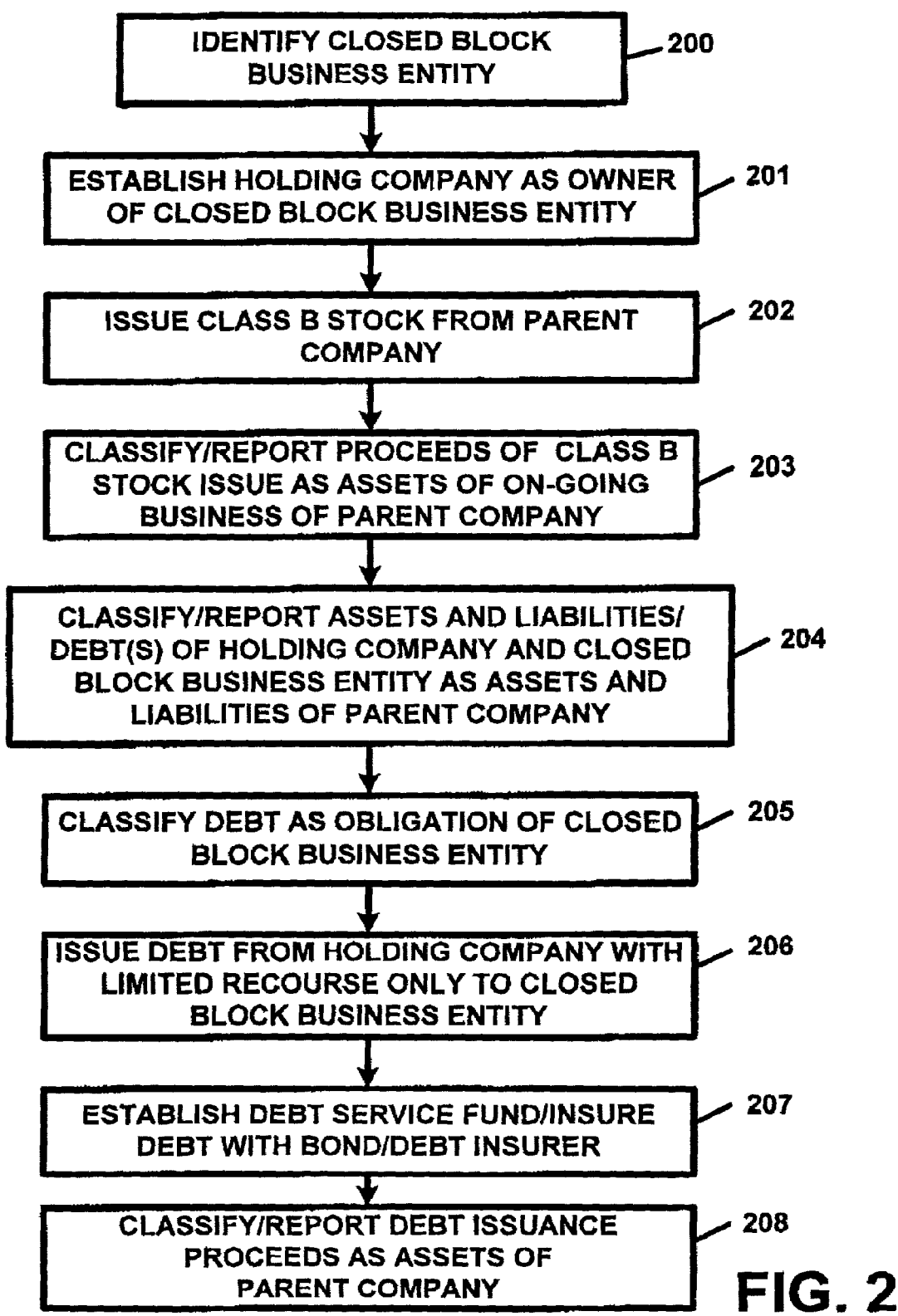
FIG. 2 illustrates a flow diagram of an embodiment for performing the method of the present invention.

FIG. 2 illustrates a flow diagram of an embodiment for performing the method of the present invention. The method described and illustrated in FIG. 2 can be utilized in order to convert or structure any type of business unit or entity into a closed block business entity. With reference to FIG. 2, the method of the present invention commences, at step 200, with the identification of the business entity or operating unit which is to be structured as the closed block business entity 10.

The business operating unit can be, for example, but is not limited to, a low-margin business unit, a low-growth business unit, a business unit which may be plagued by litigation and/or by the risk of litigation, and/or any other business operating unit or entity which, while exhibiting the above characteristics, still provides, or may be expected to provide, some benefit to a business and/or is a business operating unit which a parent company may be obligated, for any reason (i.e. legal, moral, etc.), to maintain in operation.

At step 201, the parent company 30 establishes a holding company 20 as a subsidiary (e.g. wholly-owned or partially-owned. The holding company 20 can be established as the owner/operating entity of the identified closed block business entity 10. In another embodiment, the holding company 20 can also own/operate one or more other business operating unit(s) 45 of the on-going business 40 in addition to the closed block business entity 10. In this manner, the closed block business entity 10 need not be the only business unit of the holding company 20.

In one embodiment of the present invention, the parent company 30 owns a 100% interest in the holding company 20. The holding company 20, in turn, owns a 100% interest in the closed block business entity 10. In yet another embodiment, the parent company and the holding company owns less than 100% interest in the holding company and closed block business entity, respectively.

In an embodiment of the present invention, the parent company 30 can, at step 202, issue Class B stock as a "tracking stock" of the parent company 30. The Class B stock can be issued to Common "B" shareholders 60. The Class B stock will represent the equity interest in the holding company 20 and/or the closed block business entity 10 after payment of the herein-described limited recourse debt or non-recourse debt.

The issued Class B stock can also be structured to be convertible, at the parent company's discretion, into Class A stock of the parent company 30, at a designated premium over market value or, by using any other valuation method.

In another example, the issued Class B stock can also be convertible into Class A stock of the parent company 30, at the discretion of the Common "B" shareholders 80, upon the occurrence of certain pre-specified events or conditions, such as, but not limited to, a merger, acquisition, change of control, expiration of holding time period, etc. Any appropriate method can be utilized in determining conversion valuations. In one specific embodiment, a computer utilizing a software program can be utilized to assess the fair market value of the class "B" stocks for valuation and/or convertibility.

At step 203, the proceeds or funds which are raised from the Class B stock issuance of the parent company 30 can be classified as assets of the parent company 30 in its financial reporting activities. At step 204, any of the existing cash and non-cash assets of the holding company 20 and the closed block business entity 10, such as, for example, cash assets, cash reserves, surplus, maintenance reserves, interest maintenance reserves, non-cash assets, etc., can also be classified as assets of the parent company 30. The cash and non-cash assets of the holding company 20 and/or the closed block business entity 10 can be transferred to, and/or can be utilized by, the parent company 30 on an as needed or on an on-going basis.

At step 204, the liabilities and/or debt(s) of the holding company 20 or of the closed block business entity 10 are also be classified as liabilities and/or debt(s) of the parent company 30.

At step 205, the liabilities and/or debts of the holding company 20, which can also include any debt issued by the holding company 20 which is incurred in capital raising efforts for the closed block business entity 10, are classified as liabilities and/or debt(s) of the holding company 20. In this manner, the liabilities and/or debt(s) of the holding company 20 or of the closed block business entity 10 will be classified as liabilities and/or as debt(s) of the holding company 20. The liabilities and/or debt(s) of the holding company 20 or of the closed block business entity 10, however, will not be classified as liabilities and/or debt(s) of the on-going business 40.

In another embodiment, at step 206, the holding company 20 can issue debt to debt investors 70 in order to raise operating capital for the closed block business entity 10. The debt issuance can include, but is not limited to, the issuance of any one or more of a bond issue, a corporate bond issue, an issuance of commercial paper, an issuance of convertible instruments, an issuance of hybrid instruments, and/or the issuance of any other debt instruments.

The issued debt can be limited recourse debt in cases involving a closed block business entity which is not a separate entity or non-recourse debt in cases involving a closed block business entity which is a separate entity. In a specific embodiment, a computer with a software program may be utilized to calculate whether there are sufficient cash flow arising from the closed block business entity to service the debt.

In one embodiment, the holding company 20, at step 207, establishes a debt service coverage plan and/or take steps to limit its risk of default on the issued debt. In another example, at step 207, the holding company 20 can do any one or more of the following including: establish a debt service coverage fund, establish a repayment schedule, secure the debt by utilizing the cash flows of the closed block business entity 10, and/or secure the debt by utilizing the future receivables from its existing customers/clientele and/or other third parties. The holding company 20 can also secure the debt with assets of the holding company 20 and/or with the assets of the closed block business entity 10.

In a further embodiment, at step 207, the holding company 20 can also insure the debt by utilizing the services of a bond insurer 80 which can do any one or more of resell the debt in the capital marketplace, privately place the debt, obtain reinsurance for the debt, and/or obtain a suitable hedging position for the debt by utilizing financial instruments and/or derivatives.

At step 208, the liabilities and/or debts of the holding company 20, which can also include any debt issued by the holding company 20, are classified and reported as liabilities and/or debt(s) of the holding company 20 in its financial reporting activities, financial reporting statements, and/or balance sheets. In this manner, the liabilities and/or debt(s) of the holding company 20 or of the closed block business entity 10 will not be classified as and/or reported as liabilities and/or debt(s) of the on-going business 40. The liabilities and/or debt(s) of the holding company 20 and the closed block business entity 10 can also be classified and reported as liabilities and/or debt(s) of the parent company 30.

In an embodiment of the present invention, the on-going business 40 would not be required to report the liabilities and/or debt(s) of the closed block business entity 10 in its financial reporting activities, financial reporting statements, and/or balance sheets.

As described above, the holding company 20 can reduce its default risk and/or protect itself from claims made by debt investors 70 by utilizing a debt or bond insurer 80. The holding company 20, as well as the parent company 30 and/or the on-going business 40, can also protect itself/themselves by appropriately structuring any issued debt as limited recourse debt or as non-recourse debt.

FIG. 3 illustrates an embodiment of examples of Balance Sheets reflecting post-transaction financial conditions of each of the parent company 30, the on-going business ("OB") 40 and the closed block business entity ("CBB") 10, which are involved in utilizing the method of the present invention. FIG. 3 shows that the assets and liabilities of the closed block business entity are not reported by the on-going business.

Specifically, as illustrated in FIG. 3, the assets which are reported by the parent company 30 include the assets of the closed block business entity 10 (CBB—ASSETS) and the assets of the on-going business 40 (OB—ASSETS). The liabilities of the parent company 30 include the liabilities of the closed block business entity 10 (CBB—LIABILITIES), the liabilities of the on-going business 40 (OB—LIABILITIES), and the debt of the holding company 20 (HC—DEBT). The equity of the parent company 30 can include the common stock, or Class A stock, of the Common "A" shareholders (COMMON "A" STOCK), the Class B stock of the Common "B" shareholders (COMMON "B" STOCK), the equity in the closed block business entity 10 (CBB—Equity) and the equity in the on-going business 40 (OB—Equity).

As is also illustrated in FIG. 3, the assets that are reported by the on-going business 40 on its balance sheet include the assets of the on-going business 40 (OB—ASSETS). The liabilities that are reported by the on-going business 40 on its balance sheet include the liabilities of the on-going business 40 (OB—LIABILITIES). The equity that is reported by the on-going business 40 on its balance sheet include the common stock, or Class A stock, of the Common "A" shareholders (COMMON "A" STOCK) and the equity in the on-going business 40 (OB—Equity).

As is further illustrated in FIG. 3, the assets which are reported by the closed block business entity 10 on its balance sheet include the assets of the closed block business entity 10 (CBB—ASSETS). The liabilities of the closed block business entity 10 that are reported by the closed block business entity 10 on its balance sheet include the liabilities of the closed block business entity 10 (CBB-LIABILITIES) and the debt of the holding company 20 (HC—DEBT). The equity of the closed block business entity 10 that are reported by the closed block business entity 10 on its balance sheet include the common stock, or the Class B stock, of the Common "B" shareholders (COMMON "B" STOCK) and the equity in the closed block business entity 10 (CBB—Equity).

In one specific application of the above-described embodiment, the method of the present invention can be utilized in order to create a closed block business entity for servicing and/or for maintaining insurance policies in conjunction with a de-mutualization of an insurance company or of an operating group within an insurance company.

Figure 4:
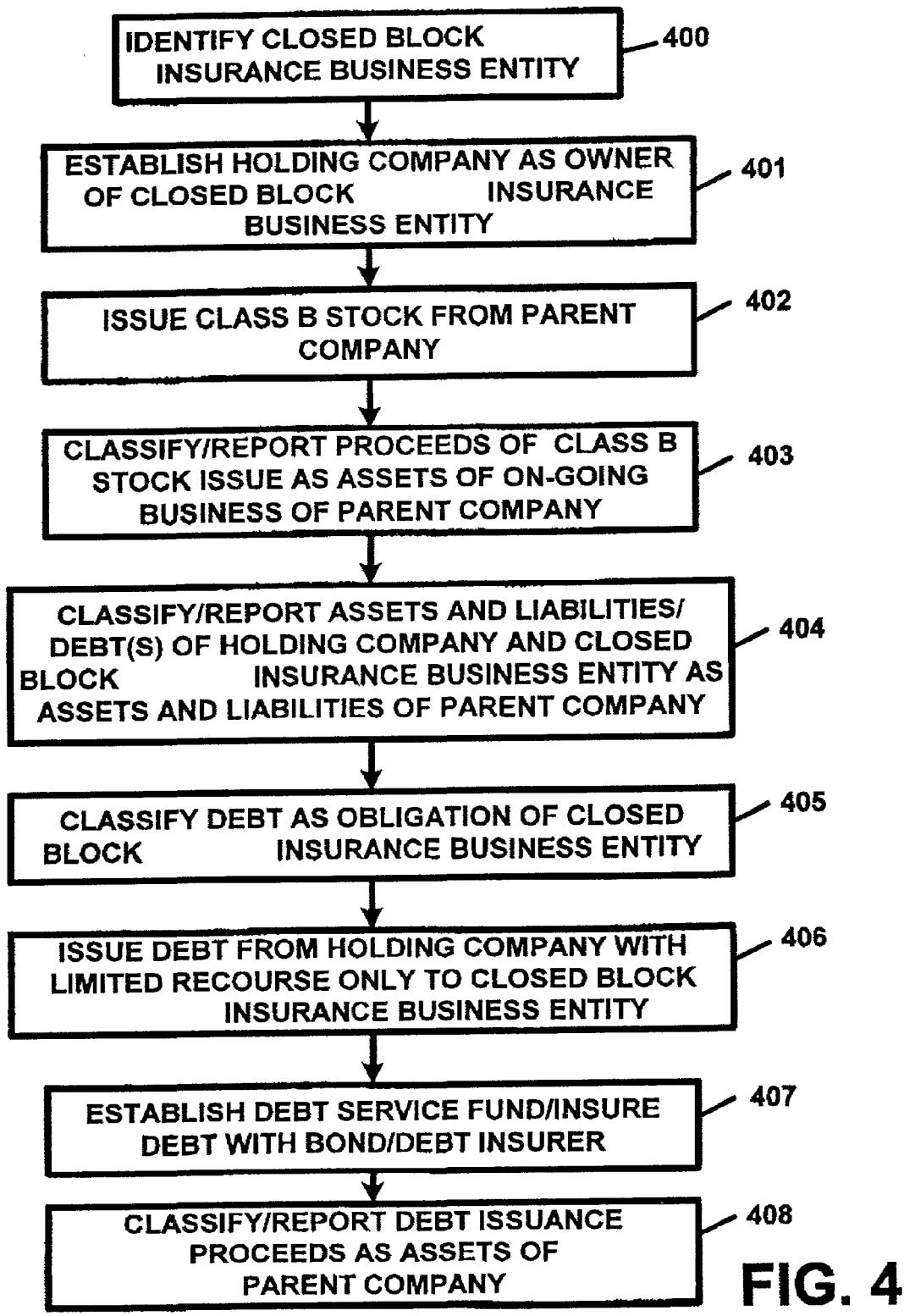
FIG. 4 illustrates a flow diagram of another embodiment for performing the method of the present invention in structuring a closed block business for an insurance business entity.

FIG. 4 illustrates a flow diagram of another embodiment of the present invention which shows one method of utilizing a closed block business for an insurance business entity.

In an example of an insurance company being de-mutualized, a "closed block business" for the insurance company can be defined as a business unit in which a portion, if not all, of the monies or funds must be segregated or "walled off" in order to be utilized for a specific purpose, such as, but not limited to, servicing pre-existing insurance policies and/or activities relating thereto, etc. In this scenario, the segregated and/or "walled off" monies or funds must be utilized only for certain specified purposes and/or be utilized as reserves pursuant to pre-existing policy commitments.

With reference to FIG. 4, the parent company 30 identifies, at step 400, the closed block business entity 10 which is to be structured as the closed block insurance business entity.

At step 401, the parent company 30 establishes a holding company 20 as a wholly-owned subsidiary. The holding company 20 is established as the owner/operating entity of the closed block business insurance entity 10. In one embodiment, the holding company 20 also owns/operates other business operating units 45 of the parent company's 30 ongoing businesses 40, including, but not limited to, other insurance operating units, non-insurance units, financial services units, and international business units, in addition to the closed block insurance business entity 10.

The parent company 30 owns a 100% interest in the holding company 20. The holding company 20, in turn, owns a 100% interest in the closed block insurance business entity 10. In yet another embodiment, the parent company and the holding company owns less than 100% interest in the holding company and closed block business entity, respectively.

In an embodiment of the present invention, the parent company 30 can, at step 402, issue Class B stock as a "tracking stock" of the parent company 30. The Class B stock can be issued to Common "B" shareholders 60. The Class B stock will represent the equity interest in the closed block insurance business entity 10 after payment of any debt issued by the holding company 20 on behalf of the closed block insurance business entity 10.

The issued Class B stock can also be structured to be convertible, at the parent company's discretion, into Class A stock of the parent company 30, at a designated premium over market value or, by using any other valuation method.

In another example, the issued Class B stock can also be convertible into Class A stock of the parent company 30, at the discretion of the Common "B" shareholders 60, upon the occurrence of certain pre-specified events or conditions, such as, but not limited to, a merger, acquisition, change of control, expiration of holding time period, etc. Any appropriate method can be utilized in determining conversion valuations.

At step 403, the proceeds or funds which are raised from the Class B stock issuance of the parent company 30 can be classified as assets of the parent company 30 in its financial reporting activities. At step 404, any of the existing cash and non-cash assets of the holding company 20 and the closed block insurance business entity 10, such as, for example, cash assets, cash reserves, surplus, maintenance reserves, interest maintenance reserves, non-cash assets, etc., can also be classified as assets of the parent company 30. The cash and non-cash assets of the holding company 20 and/or the closed block insurance business entity 10 can be transferred to, and/or can be utilized by, the parent company 30 on an as needed or on an on-going basis.

At step 404, the liabilities and/or debt(s) of the holding company 20 and the closed block insurance business entity 10 can be classified as liabilities and/or debt(s) of the parent company 30.

At step 405, the liabilities and/or debts of the holding company 20, which can also include any debt issued by the holding company 20 which is incurred in capital raising efforts for the closed block insurance business entity 10, is classified as liabilities and/or debt(s) of the holding company 20.

In this manner, the liabilities and/or debt(s) of the holding company 20 or of the closed block insurance business entity 10 will be classified as liabilities and/or as debt(s) of the holding company 20 and the parent company 30. The liabilities and/or debts of the holding company 20 or of the closed block insurance business entity 10, however, will not be classified as liabilities and/or debt(s) of the on-going business 40.

In another embodiment, at step 406, the holding company 20 can also issue debt to debt investors 70 in order to raise operating capital for the closed block insurance business entity 10. The debt issuance can include the issuance of any one or more of a bond issue, a corporate bond issue, an issuance of commercial paper, an issuance of convertible instruments, an issuance of hybrid instruments, and/or an issuance of any other debt instruments. In the embodiment of FIG. 4, the issued debt can be structured as limited recourse debt.

The holding company 20, at step 407, can establish a debt repayment plan and/or take steps to limit its risk of default on the issued debt. At step 407, the holding company 20 can do any one or more of establish a debt service coverage fund, establish a repayment schedule, secure debt repayment by utilizing future cash flows of the closed block insurance business entity 10, secure the debt with expected insurance premiums and/or expected investment returns of the closed block insurance business entity 10, and/or secure the debt by utilizing any one or more of existing assets, related assets, surplus assets, reserves, and/or interest maintenance reserves, of the closed block insurance business entity 10.

In yet another embodiment, at step 407, the holding company 20 can also insure the debt by utilizing the services of a bond insurer 80 which can do any one or more of resell the debt in the capital markets, privately place the debt, obtain reinsurance for the debt, and/or obtain a suitable hedging position for the debt.

In one specific embodiment, at step 407, the proceeds or funds which are raised from the debt issuance activities of the holding company 20 are classified as assets of the parent company 30. At step 407, any of the other existing cash and non-cash assets of the closed block insurance business entity 10, such as, for example, cash assets, cash reserves, surplus, maintenance reserves, interest maintenance reserves, non-cash assets, etc., can be classified as assets of the parent company 30. The cash and non-cash assets of the holding company 20 and/or the closed block insurance business entity 10 can be transferred to, and/or utilized by, the parent company 30 on an as needed, or on an on-going, basis.

As a result of the structure of the present invention, at step 408, the liabilities and/or debt(s) of the holding company 20, which can also include any debt(s) issued by the holding company 20 at step 406 and/or otherwise, can also be classified as liabilities and/or debt(s) of the holding company 20 as well as liabilities and/or debt(s) of the parent company 30. The issued debt(s) of the holding company 20 or of the closed block insurance business entity 10, however, will not be classified as liabilities and/or debt(s) of the on-going business 40. In this manner, an effective de-consolidation between the financial entries of the holding company 20 and the on-going business 40 is achieved.

In the above-described manner, in one example, the method of the present invention can be utilized in order to classify the assets of the closed block business insurance entity 10 and of the holding company 20 as assets of the parent company 30. Further, the liabilities and/or debt(s) of the closed block business insurance entity 10 and the holding company 20 are not classified as the liabilities and/or debt(s) of the on-going business 40.

As described above, the holding company 20 can reduce its default risk and protect itself from claims of any debt investors 70 by utilizing a debt or bond insurer 80. The holding company 20, as well as the parent company 30 and/or the on-going business 40, can also utilize appropriately structured limited recourse debt to protect itself from any creditor claims.

In the above-described manner, the method of the present invention, as described and illustrated in conjunction with the embodiment of FIG. 4, can be utilized in order to maintain the operation of an insurance operating unit subsequent to a de-mutualization of, or an initial public offering by, a parent company. The parent company 30 can also have access to the monetized embedded value of the closed block insurance entity 10.

Since, as described above, the liabilities and/or debt(s) of the holding company 20 and the closed block business entity 10 are not classified, and/or are not reported, as liabilities and/or debt(s) of the on-going business 40, the financial state of the on-going business 40 will not be effected by any liabilities and/or debt(s) of the holding company 20 or the closed block business entity 10.

In one example, the method of the present invention can be utilized in order to structure closed block business entities from low-margin, low-growth while allowing a parent company to utilize cash assets as well as non-cash assets of the closed block business entity or its respective holding company without classifying the debt(s) and/or the liabilities of the closed block business 10 as debt(s) and/or the liabilities of the on-going business 40.

In this manner, a parent company can utilize the method of the present invention in order to receive the benefits of utilizing and/or reporting the assets of a low-growth or low-margin business unit(s), or a business unit(s) which is, or which may be, subject to claims of creditors, target(s) of litigation, or alleged to be a mass tortfeasor, etc., while avoiding having to classify and/or report the debt(s) and/or liabilities of the closed block business as the debt(s) and/or liabilities of the on-going business 40.

In another embodiment, the closed block business entity 10 can be structured by utilizing a debt issue alone and/or in conjunction with an issuance of a separate class of common stock, or a "tracking stock", of the parent company 30.

In another embodiment, the method of the present invention can also be utilized in order to insulate the common shareholders of an on-going business from the liabilities and/or debt(s) of a closed block business entity. The method of the present invention can also be utilized to effectively de-consolidate the liabilities and/or debt(s) of a closed block business, which can include, but which is not limited to, low-margin business units, low-growth business units, and/or business units which may have financial exposure, from any financial reporting activities and/or entries of an on-going business. At the same time, the method of the present invention enables a parent company to abide by laws, rules, and regulations, governing a particular field in which the closed block business entity is operating.

While the present invention has been described and illustrated in various embodiments, such descriptions are merely illustrative of the present invention and are not to be construed to be limitations thereof. In this regard, the present invention encompasses all modifications, variations and/or alternate embodiments with the scope of the present invention being limited only by the claims which follow.

What is claimed is:

1. A computer implemented method for structuring an equity issue, comprising:
   (a) establishing a holding company as an owner of a closed block business entity, wherein the holding company is a subsidiary of a parent company, wherein an on-going business is a subsidiary of the parent company, and wherein the closed block business entity is a business that is established with a specific amount of assets and the assets can only be used with the closed block business entity for a specific purpose;
   (b) representing the on-going business by a first class of stock issued in the parent company;
   (c) issuing a second class of stock in the parent company, wherein the second class of stock represents an ownership interest in the closed block business entity and wherein the closed block business entity has a business growth that is less than the business growth of the on-going business;
   (d) classifying proceeds received from the issuance of the second class of stock as assets of the on-going business; and
   (e) converting said second class of stock into said first class of stock.

2. The method of claim 1, further comprising:
   (f) issuing debt from the holding company, wherein: the debt is issued for raising capital for the parent company and the capital is provided to the on-going business; and the debt is serviceable from the cash flow of the closed block business entity and the debt has limited recourse only to the closed block business entity.

3. The method of claim 1, wherein said first class of stock is a common stock.

4. The method of claim 1, wherein said second class of stock is a common stock.

5. The method of claim 1, wherein said second class of stock is a preferred class of stock.

6. The method of claim 1, wherein said second class of stock is converted into said first class of stock at the discretion of the parent company.

7. The method of claim 1, wherein said second class of stock is converted into said first class of stock at a premium conversion rate.

8. The method of claim 1, wherein said second class of stock is converted into said first class of stock upon the occurrence of at least one of a merger, an acquisition, and a change of control, involving the parent company.

9. The method of claim 1, wherein said second class of stock is converted into said first class of stock upon the expiration of a holding time period.

10. The method of claim 1, wherein the parent company owns a 100% interest in the holding company.

11. The method of claim 1, wherein the holding company owns a 100% interest in said closed block business entity.

12. The method of claim 1, wherein the parent company owns a 100% interest in the holding company.

13. The method of claim 1, wherein the holding company owns a 100% interest in said closed block business entity.

14. The method of claim 1, wherein closed block business entity is an insurance business entity selected from the group consisting of at least one of an insurance company, a mutual insurance company, and a mutual life insurance company, an insurance business unit, a mutual insurance business unit, and a mutual life insurance business unit.

15. A computer implemented method for structuring an equity issue, comprising:
   (a) establishing a holding company as an owner of a closed block business entity, wherein the holding company is a subsidiary of a parent company, wherein an on-going business is a subsidiary of the parent company, and wherein the closed block business entity is a business that is established with a specific amount of assets and the assets can only be used with the closed block business entity for a specific purpose;
   (b) representing the on-going business by a first class of stock issued in the parent company;
   (c) issuing a second class of stock in the parent company, wherein the second class of stock represents an ownership interest in the closed block business entity and wherein the closed block business entity has a business margin that is less than the business margin of the on-going business;
   (d) classifying proceeds received from the issuance of the second class of stock as assets of the on-going business; and
   (e) converting said second class of stock into said first class of stock.

16. The method of claim 15, further comprising:
   (f) issuing debt from the holding company, wherein: the debt is issued for raising capital for the parent company and the capital is provided to the on-going business; and the debt is serviceable from the cash flow of the closed block business entity and the debt has limited recourse only to the closed block business entity.

17. The method of claim 15, wherein said first class of stock is a common stock.

18. The method of claim 15, wherein said second class of stock is a common stock.

19. The method of claim 15, wherein said second class of stock is a preferred class of stock.

20. The method of claim 15, wherein said second class of stock is converted into said first class of stock at the discretion of the parent company.

21. The method of claim 15, wherein said second class of stock is converted into said first class of stock at a premium conversion rate.

22. The method of claim 15, wherein said second class of stock is converted into said first class of stock upon the occurrence of at least one of a merger, an acquisition, and a change of control, involving the parent company.

23. The method of claim 15, wherein said second class of stock is converted into said first class of stock upon the expiration of a holding time period.

24. The method of claim 15, wherein the parent company owns a 100% interest in the holding company.

25. The method of claim 15, wherein the holding company owns a 100% interest in said closed block business entity.

26. A computer implemented method for structuring an equity issue, comprising:
   (a) establishing a holding company as an owner of a closed block business entity, wherein the holding company is a subsidiary of a parent company, wherein an on-going business is a subsidiary of the parent company, and wherein the closed block business entity is a business that is established with a specific amount of assets and the assets can only be used with the closed block business entity for a specific purpose;

(b) representing the on-going business by a first class of stock issued in the parent company;

(c) issuing a second class of stock in the parent company, wherein the second class of stock represents an ownership interest in the closed block business entity and wherein the closed block business entity is a lower growth and lower margin business than the on-going business;

(d) classifying proceeds received from the issuance of the second class of stock as assets of the on-going business; and (e) converting said second class of stock into said first class of stock.

27. The method of claim 26, further comprising:

(f) issuing debt from the holding company, wherein: the debt is issued for raising capital for the parent company and the capital is provided to the on-going business; and the debt is serviceable from the cash flow of the closed block business entity and the debt has limited recourse only to the closed block business entity.

28. The method of claim 26, wherein said first class of stock is a common stock.

29. The method of claim 26, wherein said second class of stock is a common stock.

30. The method of claim 26, wherein said second class of stock is a preferred class of stock.

31. The method of claim 26, wherein said second class of stock is converted into said first class of stock at the discretion of the parent company.

32. The method of claim 26, wherein said second class of stock is converted into said first class of stock at a premium conversion rate.

33. The method of claim 26, wherein said second class of stock is converted into said first class of stock upon the occurrence of at least one of a merger, an acquisition, and a change of control, involving the parent company.

34. The method of claim 26, wherein said second class of stock is converted into said first class of stock upon the expiration of a holding time period.

35. A computer implemented method for structuring an equity issue, comprising:

(a) owning a closed block business entity by a holding company, wherein the holding company is a subsidiary of a parent company, wherein an on-going business is a subsidiary of the parent company, and wherein the closed block business entity is a business that is established with a specific amount of assets and the assets can only be used with the closed block business entity for a specific purpose;

(b) representing the on-going business by a first class of common stock in the parent company;

(c) representing a second class of stock in the parent company, wherein the second class of stock represents an ownership interest in the closed block business entity and wherein the closed block business entity has a business growth that is less than the business growth of the on-going business;

(d) classifying proceeds received from the issuance of the second class of stock as assets of the on-going business; and (e) converting said second class of stock into said first class of stock.

36. The method of claim 35, further comprising:

(f) obligating the holding company with debt, wherein the debt has limited recourse only to the closed block business entity and wherein the debt is issued for raising capital for the parent company and the capital is provided to the on-going business; and (g) servicing the debt from the cash flow of the closed block business entity.

37. A computer implemented method for structuring an equity issue, comprising:

(a) owning a closed block business entity by a holding company, wherein the holding company is a subsidiary of a parent company, wherein an on-going business is a subsidiary of the parent company, and wherein the closed block business entity is a business that is established with a specific amount of assets and the assets can only be used with the closed block business entity for a specific purpose;

(b) representing the on-going business by a first class of common stock in the parent company;

(c) representing a second class of stock in the parent company, wherein the second class of stock represents an ownership interest in the closed block business entity and wherein the closed block business entity has a business margin that is less than the business margin of the on-going business;

(d) classifying proceeds received from the issuance of the second class of stock as assets of the on-going business; and (e) converting said second class of stock into said first class of stock.

38. The method of claim 37, further comprising:

(f) obligating the holding company with debt, wherein the debt has limited recourse only to the closed block business entity and wherein the debt is issued for raising capital for the parent company and the capital is provided to the on-going business; and (g) servicing the debt from the cash flow of the closed block business entity.

39. A computer implemented method for structuring an equity issue, comprising:

(a) owning a closed block business entity by a holding company, wherein the holding company is a subsidiary of a parent company, wherein an on-going business is a subsidiary of the parent company, and wherein the closed block business entity is a business that is established with a specific amount of assets and the assets can only be used with the closed block business entity for a specific purpose;

(b) representing the on-going business by a first class of common stock in the parent company;

(c) representing a second class of stock in the parent company, wherein the second class of stock represents an ownership interest in the closed block business entity and wherein the closed block business entity has a business margin and growth that is less than the business margin of the on-going business;

(d) classifying proceeds received from the issuance of the second class of stock as assets of the on-going business; and (e) converting said second class of stock into said first class of stock.

40. The method of claim 39, further comprising:

(f) obligating the holding company with debt, wherein the debt has limited recourse only to the closed block business entity and wherein the debt is issued for raising capital for the parent company and the capital is provided to the on-going business; and (g) servicing the debt from the cash flow of the closed block business entity.

41. A computer implemented method for structuring an equity issue, comprising:

(a) owning a closed block business entity by a holding company, wherein the holding company is a subsidiary of a parent company, wherein an on-going business is a subsidiary of the parent company, and wherein the closed block business entity is a business that is established with a specific amount of assets and the assets can only be used with the closed block business entity for a specific purpose;

(b) representing the on-going business by a first class of common stock in the parent company;

(c) representing a second class of stock in the parent company, wherein the second class of stock represents an ownership interest in the closed block business entity and wherein the closed block business entity is in a traditionally risky or controversial business sector;

(d) classifying proceeds received from the issuance of the second class of stock as assets of the on-going business for financial reporting reasons; and (e) converting said second class of stock into said first class of stock.

42. The method of claim 41, further comprising:

(f) obligating the holding company with debt, wherein the debt has limited recourse only to the closed block business entity and wherein the debt is issued for raising capital for the parent company and the capital is provided to the on-going business; and (g) servicing the debt from the cash flow of the closed block business entity.

\* \* \* \* \*